(No Model.)

T. J. WILLIAMS.
PNEUMATIC TIRE.

No. 504,144.

Patented Aug 29, 1893.

WITNESSES:

INVENTOR:
T. J. Williams.
Per Robt. Ed. Phillips
Attorney.

UNITED STATES PATENT OFFICE.

THOMAS JAMES WILLIAMS, OF LONDON, ENGLAND, ASSIGNOR TO SYDNEY LEE, OF SAME PLACE.

PNEUMATIC TIRE.

SPECIFICATION forming part of Letters Patent No. 504,144, dated August 29, 1893.

Application filed April 17, 1893. Serial No. 470,664. (No model.) Patented in England May 5, 1892, No. 8,524.

*To all whom it may concern:*

Be it known that I, THOMAS JAMES WILLIAMS, a subject of the Queen of Great Britain, residing at West Norwood, London, in the county of Surrey, England, have invented a new and useful Improvement in Pneumatic or Air-Inflated Tires, (for which I have obtained a patent in Great Britain, No. 8,524, bearing date the 5th of May, 1892,) of which the following is a specification.

My invention relates to an improved method of protecting pneumatic or air inflated tires from damage by puncture, and it consists in interposing between one or other of the several component parts of the tire, a pad or lining composed of any suitable woolly or fibrous material impregnated with any suitable rosin or cognate substance, the object being to protect the said tire from puncture.

I attain the object of my invention in the manner illustrated in the accompanying drawings in which—

Figure 1:
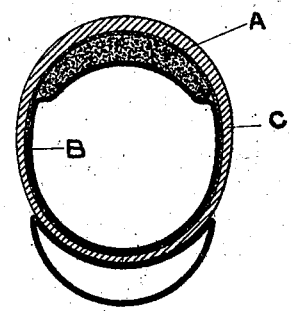
Figure 2:
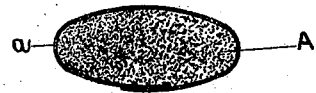
Figure 3:
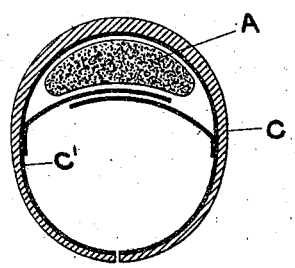
Figure 4:
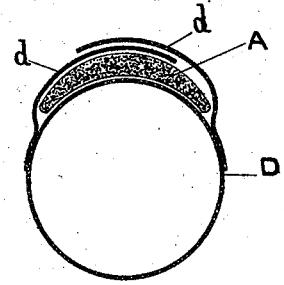
Figure 5:
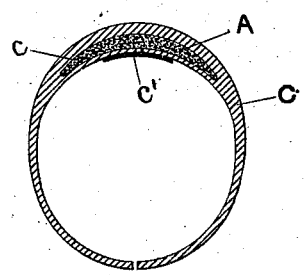
Figure 6:
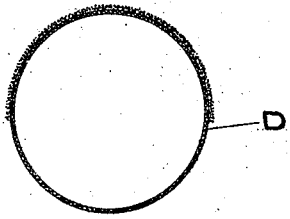

Figure 1 is a view in transverse section of a pneumatic tire in which the puncture-proof pad is placed between the air tube and the outer cover. Fig. 2 is a view in transverse section of the pad only before it is compressed. Fig. 3 is a view in transverse section of a pneumatic tire showing the puncture-proof pad placed between the canvas lining of the outer cover and the cover itself. Fig. 4 is a view in transverse section illustrating how my improved puncture-proof pad may be applied when the tire has a loose or separate tubular canvas pocket. Fig. 5 is a view in transverse section of the cover of a pneumatic tire, showing how the puncture-proof pad may be placed within the thickness of the tread of the said cover, and Fig. 6 is a view in transverse section of a tubular canvas pocket having the puncture-proof pad formed on its exterior surface.

Similar letters refer to similar parts throughout the several views.

The essential material of which my puncture-proof pad is formed is rosin or cognate substance in a finely powdered form. Although this material may be used by itself I prefer to employ it in combination with any suitable woolly or fibrous material, such as, cotton wool, wadding, or the like, as the said woolly or fibrous material holds the rosin in position and does not allow it to become compressed into a solid mass when subjected to pressure. The woolly or fibrous material may be impregnated with the rosin in any suitable manner, a convenient way being to lay the cotton wool, wadding, or the like out in one or more sheets and after sprinkling them over with the finely powdered rosin to fold or lay the sheets together to obtain a pad of the required thickness. This pad A may then if desired be inclosed in a suitable wrapper $a$ of canvas or other textile fabric, the shape and size of the pad being such as will give the tire to which it is applied protection over any desired portion of its exposed surface. The pad A may be either placed loosely within the outer cover of the tire C—between it and the air tube B—as shown by Fig. 1 of the accompanying drawings, or it may be placed between the lining $C'$ of the cover C as shown by Fig. 3 of the accompanying drawings, in which case the said canvas lining is preferably formed with flaps as shown by Fig. 3.

In applying my puncture-proof pad to tires having a separate or loose tubular canvas pocket, I prefer to place the pad A on the exterior of the said pocket D and form small canvas flaps $d, d$, to inclose the pad. As a modification a recess $c$ may be formed in the thickness of the tread of the cover C to receive the pad A as shown by Fig. 5 of the accompanying drawings, the inner part of the said covering being slit circumferentially to admit of the introduction of the pad A after which it may be closed by a suitable strip $c'$ of canvas or other material.

As a further modification the canvas pocket D may be made with a woolly or nappy exterior surface as shown by Fig. 6 of the accompanying drawings, the said woolly or nappy surface being impregnated with the powdered rosin in the manner hereinbefore described. When I use powdered rosin alone for forming this pad I prefer to inclose it within the cover of the tire as shown by Fig. 5 of the accompanying drawings.

I wish it to be clearly understood that this puncture-proof pad may be applied to all types of tires irrespective of their construction, or the method by which they are attached to the wheel rim, and that it may also be applied to covers adapted to be applied or fixed to existing tires.

Having now particularly described and ascertained the nature of my said invention and in what manner the same is to be performed, what I desire to secure by Letters Patent is—

1. As a new article of manufacture a puncture-proof pad or lining for pneumatic tires, composed of rosin or cognate substance in a finely powdered form, as set forth.

2. As a new article of manufacture, a puncture-proof pad for pneumatic tires composed of any suitable woolly or fibrous material impregnated with powdered rosin, as set forth.

3. A pneumatic tire, consisting of an outer cover C, an air tube B, and a puncture-proof pad A composed of any suitable woolly or fibrous material impregnated with powdered rosin, as set forth.

4. In a pneumatic tire, the combination with the outer cover, of a pad or lining composed of any suitable woolly or fibrous material impregnated with powdered rosin or cognate substance and inclosed in a cover of canvas or other textile material, as set forth.

5. A pneumatic tire, consisting of an outer cover C, an air tube B, a tubular canvas pocket D having flaps $d, d$, and of a puncture-proof pad A composed of any suitable woolly or fibrous material impregnated with powdered rosin, as set forth.

6. As a new article of manufacture a retaining tubular pocket for pneumatic or air inflated tires formed of canvas or other fabric, having a woolly or nappy exterior surface impregnated with powdered rosin or cognate substance, as and for the purpose set forth.

THOMAS JAMES WILLIAMS.

Witnesses:
   ROBT. ED. PHILLIPS,
   W. H. JAMES,
*Both of* 70 *Chancery Lane, W. C.*